US009571252B2

United States Patent
Tiirola et al.

(10) Patent No.: US 9,571,252 B2
(45) Date of Patent: Feb. 14, 2017

(54) METHOD AND APPARATUS FOR SIGNALLING OF HARQ TIMING AT UL/DL SUBFRAME RECONFIGURATION

(75) Inventors: Esa Tapani Tiirola, Kempele (FI); Kari Juhani Hooli, Oulu (FI); Timo Erkki Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 57 days.

(21) Appl. No.: 14/411,939

(22) PCT Filed: Jul. 4, 2012

(86) PCT No.: PCT/EP2012/063052
§ 371 (c)(1),
(2), (4) Date: Dec. 30, 2014

(87) PCT Pub. No.: WO2014/005632
PCT Pub. Date: Jan. 9, 2014

(65) Prior Publication Data
US 2015/0172030 A1    Jun. 18, 2015

(51) Int. Cl.
*H04L 5/00* (2006.01)
*H04L 1/18* (2006.01)
(Continued)

(52) U.S. Cl.
CPC ........... *H04L 5/0055* (2013.01); *H04L 1/1812* (2013.01); *H04L 1/1854* (2013.01); *H04L 1/1887* (2013.01);
(Continued)

(58) Field of Classification Search
CPC .... H04L 1/1812; H04L 1/1854; H04L 1/1887; H04L 5/0055; H04L 5/0087; H04L 5/0092; H04L 5/0096; H04L 5/14; H04W 72/0446; H04W 72/1289
(Continued)

(56) References Cited

U.S. PATENT DOCUMENTS

2012/0020310 A1*  1/2012  Ji .......................... H04W 48/16
                                                    370/329
2012/0155337 A1*  6/2012  Park ....................... H04L 1/1692
                                                    370/280
(Continued)

FOREIGN PATENT DOCUMENTS

WO    WO 2013/023683    2/2013

OTHER PUBLICATIONS

3GPP TSG RAN WG1 Meeting #69, Prague, Czech Republic, May 21-25, 2012, R1-122267, "Dynamic reconfiguration of TDD UL-DL configuration", Samsung, 2 pgs.
(Continued)

*Primary Examiner* — Chi H Pham
*Assistant Examiner* — Robert Lopata
(74) *Attorney, Agent, or Firm* — Harrington & Smith

(57) ABSTRACT

The invention relates to an apparatus including at least one processor and at least one memory including a computer program code, the at least one memory and the computer program code configured to, with the at least one processor, cause the apparatus at least to: determine a configuration change at a border of a current radio frame and a following radio frame, schedule during the current radio frame physical downlink shared channel and/or physical uplink shared channel resources having an impact on the following radio frame based on the configuration change, and apply hybrid automatic repeat request and signaling timing according to the physical downlink shared channel and/or physical uplink shared channel resource scheduling from a beginning of the following radio frame, wherein a frame carrying the physical downlink shared channel and/or physical uplink shared channel resource scheduling indicates the timing.

12 Claims, 3 Drawing Sheets

(51) Int. Cl.
*H04L 5/14* (2006.01)
*H04W 72/04* (2009.01)
*H04W 72/12* (2009.01)

(52) U.S. Cl.
CPC ........... *H04L 5/0087* (2013.01); *H04L 5/0092* (2013.01); *H04L 5/0096* (2013.01); *H04L 5/14* (2013.01); *H04W 72/0446* (2013.01); *H04W 72/1289* (2013.01)

(58) Field of Classification Search
USPC ........................................................ 370/280
See application file for complete search history.

(56) References Cited

U.S. PATENT DOCUMENTS

| | | | | |
|---|---|---|---|---|
| 2012/0230272 A1* | 9/2012 | Kim | ....................... | H04L 1/1861 370/329 |
| 2012/0257554 A1* | 10/2012 | Kim | ....................... | H04L 5/001 370/280 |
| 2013/0083708 A1* | 4/2013 | Lin | ........................... | H04L 5/14 370/280 |
| 2013/0223295 A1* | 8/2013 | Choi | ................. | H04W 72/0406 370/280 |
| 2013/0272169 A1* | 10/2013 | Wang | ................ | H04W 72/0446 370/280 |
| 2013/0272170 A1* | 10/2013 | Chatterjee | ............. | H04W 28/02 370/280 |
| 2013/0294242 A1* | 11/2013 | Zhao | ................. | H04W 72/1252 370/235 |
| 2013/0301433 A1* | 11/2013 | Yin | ....................... | H04W 16/02 370/252 |
| 2013/0301490 A1* | 11/2013 | He | ....................... | H04W 76/048 370/280 |
| 2013/0308550 A1* | 11/2013 | Yin | ........................ | H04L 5/001 370/329 |
| 2013/0322307 A1* | 12/2013 | Yang | ..................... | H04L 1/1854 370/280 |
| 2014/0044085 A1* | 2/2014 | Hong | .................... | H04L 5/0037 370/329 |
| 2014/0092794 A1* | 4/2014 | Yang | .................... | H04B 7/2656 370/280 |
| 2014/0112217 A1* | 4/2014 | Ahn | ..................... | H04B 7/2656 370/280 |
| 2014/0362796 A1* | 12/2014 | Seo | ........................ | H04L 1/1854 370/329 |
| 2015/0055521 A1* | 2/2015 | Seo | .......................... | H04L 5/001 370/280 |
| 2015/0055522 A1* | 2/2015 | Fu | ........................ | H04L 5/0007 370/280 |
| 2015/0085712 A1* | 3/2015 | Wang | .................. | H04W 76/048 370/280 |
| 2015/0092628 A1* | 4/2015 | Zhao | .................... | H04L 1/1861 370/280 |
| 2015/0110082 A1* | 4/2015 | Sun | ....................... | H04L 1/1854 370/336 |
| 2015/0327229 A1* | 11/2015 | Zhang | .................. | H04L 1/1854 370/280 |

OTHER PUBLICATIONS

3GPP TSG-RAN WG1 Meeting #69, Prague, Czech Republic, May 21-25, 2012, R1-122435, "Discussion on Methods to Support different time scale for TDD UL-DL reconfiguration", Nokia Corporation, Nokia Siemens Networks, 4 pgs.

3GPP TSG RAN WG1 Meeting #69, Prague, Czech republic, May 21-25, 2012, R1-122510, "Discussion on timing issues with dynamic TDD UL-DL configuration", Alcatel-Lucent Shanghai Bell, Alcatel-Lucent, 8 pgs.

3GPP TSG RAN WG1 Meeting #69, Prague, Czech Republic, May 21-25, 2012, R1-122909, "Methods to support different time scales for TDD-UL-DL reconfiguration", Huawei, HiSilicon, 4 pgs.

3GPP TS 36.213 V10.6.0 (Jun. 2012), "3$^{rd}$ Generation Partnership Project; Technical Specification Group Radio Access Network; Evolved Universal Terrestrial Radio Access (E-UTRA); Physical layer procedures (Release 10)", 125 pgs.

Ericsson et al: "Remaining issues in general frame work for aggregation of carriers with different UL/DL configurations"; 3GPP Draft; 3rd Generation Partnership Project (3GPP); Mobile Competence Centre; 650, Route des Lucioles; F-06921 Sophia-Antipolis Cedex; France; vol. RAN WG1, no. Dresden, Germany; Feb. 6, 2012-Feb. 10, 2012, Jan. 31, 2012; XP050562653; [retrieved on Jan. 31, 2012]; p. 1, section 1 "Introduction"—p. 2, section 4 "Conclusion".

* cited by examiner

METHOD AND APPARATUS FOR SIGNALLING OF HARQ TIMING AT UL/DL SUBFRAME RECONFIGURATION

FIELD

The invention relates to apparatuses, methods, systems, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Dynamic uplink and/or downlink allocations may provide significant throughput gains in certain time division duplex (TDD) deployment cases, such as local area networks. A study item in the 3rd Generation Partnership Project (3GPP) investigating dynamic traffic adaptation and cross-link interference (interference between the uplink (UL) and the downlink (DL) with regard to dynamic traffic adaptation) exists.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: determine a configuration change at a border of a current radio frame and a following radio frame, schedule during the current radio frame physical downlink shared channel and/or physical uplink shared channel resources having an impact on the following radio frame based on the configuration change, and apply hybrid automatic repeat request and signaling timing according to the physical downlink shared channel and/or physical uplink shared channel resource scheduling from a beginning of the following radio frame, wherein a frame carrying the physical downlink shared channel and/or physical uplink shared channel resource scheduling indicates the timing.

According to an aspect of the present invention, there is provided an apparatus comprising: at least one processor and at least one memory including a computer program code, the at least one memory and the computer program code configured to, with the at least one processor, cause the apparatus at least to: obtain information on scheduling for physical downlink shared channel and/or physical uplink shared channel resources having an impact on a radio frame following a configuration change, and provide a special procedure for hybrid automatic repeat request acknowledgement signals corresponding to physical downlink shared channel and/or physical uplink shared channel scheduled during a current radio frame, and/or physical uplink shared channel scheduling information obtained during the current radio frame.

According to yet another aspect of the present invention, there is provided a method comprising: determining a configuration change at a border of a current radio frame and a following radio frame, scheduling during the current radio frame physical downlink shared channel and/or physical uplink shared channel resources having an impact on the following radio frame based on the configuration change, and applying hybrid automatic repeat request and signaling timing according to the physical downlink shared channel and/or physical uplink shared channel resource scheduling from a beginning of the following radio frame, wherein a frame carrying the physical downlink shared channel and/or physical uplink shared channel resource scheduling indicates the timing.

According to yet another aspect of the present invention, there is provided a method comprising: obtaining information on scheduling for physical downlink shared channel and/or physical uplink shared channel resources having an impact on a radio frame following a configuration change, and providing a special procedure for hybrid automatic repeat request acknowledgement signals corresponding to physical downlink shared channel and/or physical uplink shared channel scheduled during a current radio frame, and/or physical uplink shared channel scheduling information obtained during the current radio frame.

According to yet another aspect of the present invention, there is provided an apparatus comprising: means for determining a configuration change at a border of a current radio frame and a following radio frame, means for scheduling during the current radio frame physical downlink shared channel and/or physical uplink shared channel resources having an impact on the following radio frame based on the configuration change, and means for applying hybrid automatic repeat request and signaling timing according to the physical downlink shared channel and/or physical uplink shared channel resource scheduling from a beginning of the following radio frame, wherein a frame carrying the physical downlink shared channel and/or physical uplink shared channel resource scheduling indicates the timing.

According to yet another aspect of the present invention, there is provided an apparatus comprising: means for obtaining information on scheduling for physical downlink shared channel and/or physical uplink shared channel resources having an impact on a radio frame following a configuration change, and means for providing a special procedure for hybrid automatic repeat request acknowledgement signals corresponding to physical downlink shared channel and/or physical uplink shared channel scheduled during a current radio frame, and/or physical uplink shared channel scheduling information obtained during the current radio frame.

According to yet another aspect of the present invention, there is provided a computer program embodied on a computer-readable storage medium, the computer program comprising program code for controlling a process to execute a process, the process comprising: determining a configuration change at a border of a current radio frame and a following radio frame, scheduling during the current radio frame physical downlink shared channel and/or physical uplink shared channel resources having an impact on the following radio frame based on the configuration change, and applying hybrid automatic repeat request and signaling timing according to the physical downlink shared channel and/or physical uplink shared channel resource scheduling from a beginning of the following radio frame, wherein a frame carrying the physical downlink shared channel and/or physical uplink shared channel resource scheduling indicates the timing.

According to yet another aspect of the present invention, there is provided a computer program embodied on a computer-readable storage medium, the computer program comprising program code for controlling a process to execute a process, the process comprising: obtaining information on scheduling for physical downlink shared channel and/or physical uplink shared channel resources having an impact on a radio frame following a configuration change, and providing a special procedure for hybrid automatic repeat request acknowledgement signals corresponding to physical downlink shared channel and/or physical uplink shared channel scheduled during a current radio frame, and/or physical uplink shared channel scheduling information obtained during the current radio frame.

LIST OF DRAWINGS

Some embodiments of the present invention are described below, by way of example only, with reference to the accompanying drawings, in which FIG. 1 illustrates an example of a system;

DESCRIPTION OF SOME EMBODIMENTS

Figure 1:
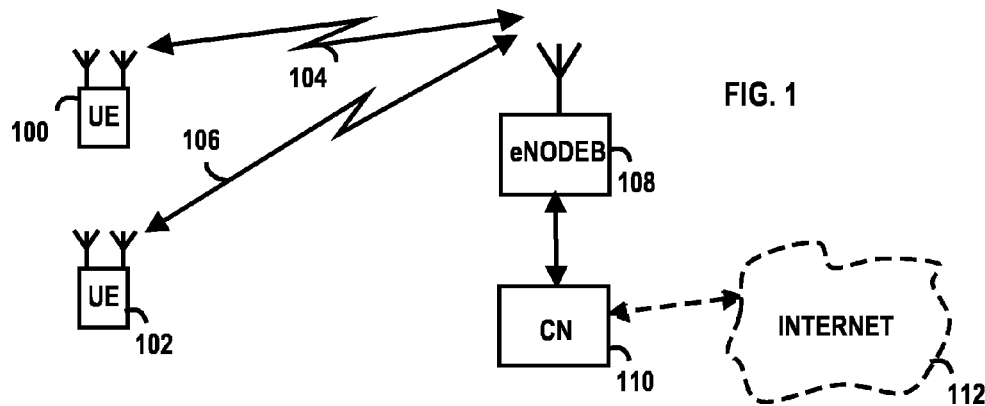

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS).

In an orthogonal frequency division multiplexing (OFDM) system, the available spectrum is divided into multiple orthogonal sub-carriers. In OFDM systems, the available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule transmissions to user devices. Such required information is usually signalled to the (e)NodeB.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

FIG. 1 shows a part of a radio access network based on E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104 and 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to as a base station, an access point or any other type of interfacing device including a relay station capable of operating in a wireless environment.

The (e)NodeB includes transceivers, for example. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services. It should be appreciated that (e)NodeBs or their functionalities may be implemented by using any node, host, server or access point etc. entity suitable for such a usage.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeBs of FIG. 1 may provide any kind of these cells. A cellular radio system may be implemented as a multilayer network including several kinds of cells. Typically, in multilayer networks, one node B provides one kind of a cell or cells, and thus a plurality of (e) Node Bs are required to provide such a network structure.

Recently for fulfilling the need for improving the deployment and performance of communication systems, the concept of "plug-and-play" (e)NodeBs has been introduced. Typically, a network which is able to use "plug-and-play" (e)Node (e)Bs, includes, in addition to Home (e)NodeBs (H(e)nodeBs), a home node B gateway, or HNB-GW (not shown in FIG. 1). A HNB Gateway (HNB-GW), which is typically installed within an operator's network may aggregate traffic from a large number of HNBs back to a core network.

Dynamic uplink and/or downlink allocations may provide significant throughput gains in certain deployment cases, such as local area networks. A study item in 3GPP investigating dynamic traffic adaptation and cross-link interference (interference between the uplink (UL) and the downlink (DL) with regard to dynamic traffic adaptation) exists. It should be appreciated that hybrid automatic repeat request (HARQ) feedback and uplink scheduling normally continues over a radio frame border that is to say over the uplink/downlink re-configuration point between radio frames. Hence, HARQ feedback resources may not be available for certain physical uplink shared channel (PUSCH) and/or physical downlink shared channel (PDSCH) subframes of a previous radio frame (in other words previous UL/DL configuration) due to wrong link direction of a current UL/DL configuration. Additionally, the UL may not be available in a following radio frame for PUSCH according to a scheduling decision made in the previous radio frame.

One embodiment may be carried out by a device configured to operate as a network apparatus, such as a server, (e)node or host. The embodiment may also be provided as a cloud service. The embodiment is suitable for enabling dynamic change of uplink/downlink configuration at the border of two radio frames while maintaining existing uplink/downlink configurations and maintaining HARQ and signaling timing of existing UL/DL configurations instead of designing new timing. The embodiment starts in block 200 of FIG. 2.

In block 202, a configuration change at a border of a current radio frame and a following radio frame is determined.

The determining may take place during a current radio frame or earlier. The determining may comprise identifying predetermined configuration (such as subframe) transitions. The transitions may be in relation to absence of a hybrid automatic repeat request acknowledgement (HARQ-ACK) channel, absence of an uplink channel and physical uplink shared channel (PUSCH) scheduling. The transitions may require a special procedure that is to say a procedure which is different from a "normal" procedure. Some of such transitions are listed below as an example. It should be appreciated that the determining may also comprise identification of the need for a configuration change according to a normal procedure in changing a configuration.

Since the availability of an uplink HARQ-ACK (ACK=acknowledgement) channel depends on the availability of uplink resources (such as a subframe) according to a (predefined) HARQ-ACK timing, following transitions from a previous UL/DL configuration to a following UL/DL configuration may require special procedure when allocating PDSCH: #1 (PDSCH on subframe #9) to subframe #2, #5; #2 (PDSCH on subframe #9) to subframe #3, #4, #5; #3 (PDSCH on subframe #7, #8, #9) to subframe #2, #5 (subframe 7,8)+#1, #4 (subframe 9); #4 (PDSCH on subframe #6, 7, 8, 9) to subframe #2, #5; #6 (PDSCH on subframe #6, 9) to subframes #2, #5 (subframe 6)+#1, #4 (subframe 9). The uplink HARQ-ACK channel is usually in relation to a downlink.

Since the availability of a (downlink) HARQ-ACK channel on a PHICH channel depends on the availability of downlink resources (such as a subframe) according to a (predefined) HARQ-ACK timing, following transitions from a previous UL/DL configuration to a following UL/DL configuration may require special procedure when allocating #2 (PUSCH on subframe #7) to subframes #0, #1, #3, #4, #6.

Since the availability of an uplink channel depends on the availability of physical uplink shared channel (PUSCH) resources (such as a subframe) according to (predefined) PUSCH scheduling timing, following transitions from a previous UL/DL configuration to a following UL/DL configuration may require special procedure when allocating PUSCH: #0 (scheduling grant on subframe #6) to subframe #2, #5 (multi-transmission time interval scheduling only); #1 (scheduling grant on subframe #9) to subframe #2, #5; #3 (scheduling grant on subframe #9) to subframe #2, #5; #4 (scheduling grant on subframe #9) to subframe #2, #5, #6 (scheduling grant on subframe #6 or #9) to subframe #2, #5 (subframe 9)+#2, #4 (subframe 6)

Following transitions from a previous UL/DL configuration to a following UL/DL configuration may require special procedure for PUSCH scheduling in subframe 3: subframe #2 to subframe #0, #1, #3, #4, #6; subframe #5 to subframe #0, #1, #3, #4, #6.

A special procedure may comprise changing hybrid automatic repeat request acknowledgement (HARQ-ACK) and/or physical uplink shared channel (PUSCH) scheduling timing, defining timing for a packet by using a configuration of a radio frame carrying the physical uplink shared channel (PUSCH) and/or physical downlink shared channel (PDSCH) scheduling, and/or applying for a configuration change a procedure of user device hybrid automatic repeat request acknowledgement (HARQ-ACK) time division duplex when a user device is configured with more than one serving cell and if uplink and/or downlink configurations are different for different cells. Some examples of the special procedure are explained in further detail below.

In block 204, physical downlink shared channel and/or physical uplink shared channel resources having an impact on the following radio frame are scheduled during the current radio frame based on the configuration change.

In an embodiment, the UL/DL configuration change is taken into account when resources for PDSCH and/or PUSCH having an impact on a following radio frame (usually either HARQ-ACK or scheduled PUSCH) are scheduled.

In an embodiment, procedure for error situations or failures caused by the change of a radio link direction is provided. A node or server may have capability for providing special procedure for the HARQ-ACK (ACK=acknowledgement) signals corresponding to PDSCH and/or PUSCH scheduled during a current radio frame as well as for PUSCH scheduling. The node may select between special procedure and no-special procedure according to the type of the configuration change. This selection may be indicated by one (one at least one) bit and conveyed via UL and/or DL scheduling grants. An example of special procedure is described below.

In a special case of a plurality of legacy user devices on a same carrier, some restrictions may be set to scheduling resources for PUSCH and/or PDSCH: a cell may be configured to have certain UL/DL configuration (according to Rel-8 procedure), a node may apply dynamic UL/DL configuration only for user devices supporting dynamic UL/DL configuration (on a radio-frame basis) and/or the node may apply scheduler restrictions to avoid simultaneous UL/DL transmission in a cell.

In block 206, hybrid automatic repeat request and signaling timing is applied according to the physical downlink shared channel and/or physical uplink shared channel resource scheduling from a beginning of the following radio frame, wherein a frame carrying the physical downlink shared channel and/or physical uplink shared channel resource scheduling indicates the timing.

During a following radio frame (a following frame to a current radio frame), HARQ and signaling timing according to a new UL/DL configuration may be taken into use for scheduled PUSCH and/or PDSCH from the beginning of the following radio frame. A radio frame carrying the PUSCH and/or PDSCH scheduling may define the timing for the corresponding packet (including related HARQ-ACK and potential retransmissions). For stopping HARQ re-transmissions, a false ACK may be transmitted on a physical hybrid ARQ indicator channel (PHICH). A user device may automatically halt re-transmissions in the case the corresponding PHICH resource is missing. Re-transmissions may be restarted by using scheduled re-transmissions which may use asynchronous HARQ.

A special procedure may also be provided for the following radio frame. In one embodiment, the special procedure may be provided for hybrid automatic repeat request acknowledgement (HARQ-ACK) signals corresponding to a physical downlink shared channel (PDSCH) and/or physical uplink shared channel (PUSCH) scheduled during the radio frame previous to the following radio frame (called a current radio frame), and/or for physical uplink shared channel (PUSCH) scheduling.

A special procedure may comprise changing hybrid automatic repeat request acknowledgement (HARQ-ACK) and/or physical uplink shared channel (PUSCH) scheduling timing, defining timing for a packet by using a configuration of a radio frame carrying the physical uplink shared channel (PUSCH) and/or physical downlink shared channel (PDSCH) scheduling, and/or applying for a configuration change a procedure of user device hybrid automatic repeat request acknowledgement (HARQ-ACK) time division duplex when a user device is configured with more than one serving cell and if uplink and/or downlink configurations are different for different cells. Examples of the special procedure are explained in further detail below.

In the following, a more detailed example of a special procedure of HARQ-ACK signals corresponding to PDSCH and/or PUSCH scheduled during a current radio frame, or that of PUSCH scheduling is described. The special procedure is suitable for processing a "tail of a previous radio frame". One option is to change HARQ-ACK and/or PUSCH scheduling timing according to a special procedure signaling conveyed with regard to UL and/or DL grant and to transmit HARQ-ACK or PUSCH using a next suitable subframe.

First, a downlink HARQ is considered. In this case, a user device may automatically halt PUSCH re-transmissions, if a corresponding physical hybrid ARQ indicator channel (PHICH) resource is missing in a new UL and/or DL configuration.

It is also assumed that asynchronous HARQ (with a HARQ process identity (ID) in an UL grant) is introduced to the UL of the time division duplex LTE, which allows completing on-going HARQ processes when UL and/or DL configuration is changed.

Figure 3:
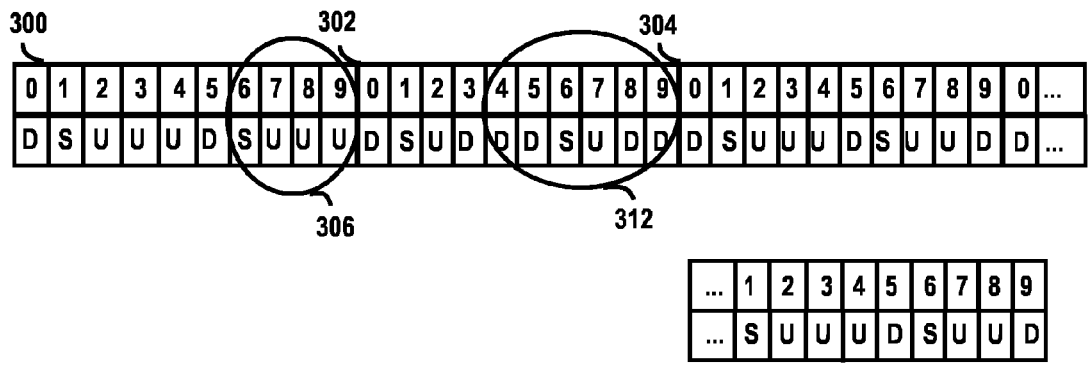
FIG. 3 illustrates an example of a procedure.
Figure 3:
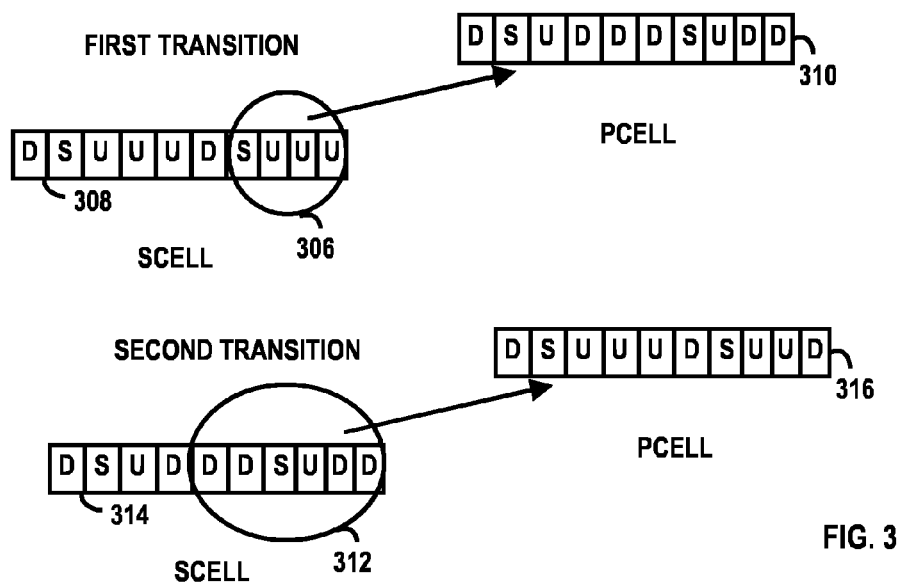

As to an uplink HARQ, the problem with timing takes place when a transition from one UL and/or DL configuration to another between two radio frames (we denote them as radio frames a and a+1) is made. In this case, it is possible to apply the methodology and rules defined for the purpose of carrier aggregation with different UL/DL configurations for different bands. That is to say that signals triggered in the radio frame a having UL/DL configuration x, but transmitted in the radio frame a+1 having UL/DL configuration y, are treated as if they were signals triggered in a secondary cell (SCell) having the UL/DL configuration x, but transmitted on a primary cell (PCell) having the UL/DL configuration y. This is further clarified by means of FIG. 3. In the FIG. 3, letter D means a downlink subframe, U means an uplink subframe and S means a signaling subframe. In this example, three subframes 300 and two UL/DL configuration transitions on a radio frame border 302, 304 are shown. In the case, an UL HARQ-ACK feedback for some DL subframes 306, 312 belonging to radio frame a needs to be transmitted during radio frame a+1. Herein timing rules defined for carrier aggregation as described above may be applied to define appropriate resources for UL HARQ-ACK in the radio frame a+1. In the example of FIG. 3, the first transition is from secondary cell 308 to primary cell 310 for downlink subframes 306 and the second transition is from secondary cell 314 to primary cell 316 for downlink subframes 312.

It should be appreciated that the same basic principle is applicable to other channels as well, such as PUSCH and/or PHICH.

As to a PUSCH scheduling problem, a PUSCH resource is not available in a following radio frame for an UL grant in a current radio frame or an UL grant is not available in the current radio frame for PUSCH in subframe 3 of the following radio frame. In this case, a special procedure bit may be set in the UL grant of the current radio frame, a corresponding PUSCH resource may be located in the following radio frame, and a user device may use the UL grant PUSCH mapping according to the UL and/or DL configuration in the following radio frame (for instance by using a parameter value defined for the UL/DL configuration in the following radio frame). Another option is to use the timing rules defined in A-2 also for PUSCH scheduling.

The embodiment ends in block 208. The embodiment is repeatable in many ways. One example is shown by arrow 210 in FIG. 2.

Another embodiment may be carried out by a device configured to operate as a user device. The embodiment is suitable for enabling dynamic change of UL/DL configuration at the border of two radio frames while maintaining existing UL/DL configurations and maintaining HARQ and signaling timing of existing UL/DL configurations instead of designing new timing. The embodiment starts in block 400 of FIG. 4.

In block 402, information on scheduling for physical downlink shared channel and/or physical uplink shared channel resources having an impact on a radio frame following a configuration change is obtained.

Typically, the information is received from a (e)node.

In block 404, a special procedure for hybrid automatic repeat request acknowledgement signals corresponding to physical downlink shared channel and/or physical uplink shared channel scheduled during a current radio frame, and/or for physical uplink shared channel scheduling information obtained during the current radio frame is provided.

During a following radio frame (a following frame to a current radio frame), HARQ and signaling timing according to a new UL/DL configuration may be taken into use for scheduled PUSCH and/or PDSCH from the beginning of the following radio frame. A radio frame carrying the PUSCH and/or PDSCH scheduling may define the timing for the corresponding packet (including related HARQ-ACK (ACK=acknowledgement) and potential retransmissions). For stopping HARQ re-transmissions, information on a missing a physical hybrid automatic repeat request indicator channel (PHICH) resource corresponding to a previous physical uplink shared channel (PUSCH) transmission may be obtained. Such information may be a false ACK. Re-transmissions may be restarted by using scheduled re-transmissions which may use asynchronous HARQ.

A special procedure may comprise changing the hybrid automatic repeat request acknowledgement (HARQ-ACK) and/or physical uplink shared channel (PUSCH) scheduling timing, defining timing for a packet by using a configuration of a radio frame carrying the physical uplink shared channel (PUSCH) and/or physical downlink shared channel (PDSCH) scheduling, and/or and applying for a configuration change a procedure of user device hybrid automatic repeat request acknowledgement (HARQ-ACK) time division duplex when a user device is configured with more than one serving cell and if uplink and/or downlink configurations for different cells are different. The use of the special procedure may be indicated by at least one bit and conveyed via uplink and/or downlink scheduling grants.

In the following, a more detailed example of special procedure of HARQ-ACK signals corresponding to PDSCH and/or PUSCH scheduled during a current radio frame, or that of PUSCH scheduling is described. The special procedure method is suitable for processing handling "tail of a previous radio frame". One option is to change HARQ-ACK and/or PUSCH scheduling timing according to a special procedure signaling conveyed with regard to UL and/or DL grant and to transmit HARQ-ACK or PUSCH using a next suitable subframe.

First, a downlink HARQ is considered. In this case, a user device may automatically halt PUSCH re-transmissions, if a corresponding physical hybrid ARQ indicator channel (PHICH) resource is missing in a new UL and/or DL configuration.

It is also assumed that asynchronous HARQ (with a HARQ process identity (ID) in an UL grant) is introduced to the UL of the time division duplex LTE, which allows completing on-going HARQ processes when UL and/or DL configuration is changed.

As to an uplink HARQ, the problem with timing takes place when a transition from one UL and/or DL configuration to another between two radio frames (we denote them as radio frames a and a+1) is made. In this case, it is possible to apply the methodology and rules defined for the purpose of carrier aggregation with different UL/DL configurations for different bands. That is to say that signals triggered in the radio frame a having UL/DL configuration x, but transmitted in the radio frame a+1 having UL/DL configuration y, are treated as if they were signals triggered in a secondary cell (SCell) having the UL/DL configuration x, but transmitted on a primary cell (PCell) having the UL/DL configuration y. This is further clarified by means of FIG. 3. In the FIG. 3, letter D means a downlink subframe, U means an uplink subframe and S means a signaling subframe. In this example, three subframes 300 and two UL/DL configuration transitions on a radio frame border 302, 304 are shown. In the case, an UL HARQ-ACK feedback for some DL subframes 306, 312 belonging to radio frame a needs to be transmitted during radio frame a+1. Herein timing rules defined for carrier aggregation as described above may be applied to define appropriate resources for UL HARQ-ACK in the radio frame a+1. In the example of FIG. 3, the first transition is from secondary cell 308 to primary cell 310 for downlink subframes 306 and the second transition is from secondary cell 314 to primary cell 316 for downlink subframes 312.

It should be appreciated that the same basic principle is applicable to other channels as well, such as PUSCH and/or PHICH.

As to a PUSCH scheduling problem, a PUSCH resource is not usually available in a following radio frame for an UL grant in a current radio frame or an UL grant is not available in the current radio frame for PUSCH in subframe 3 of the following radio frame. In this case, a special procedure bit may be set in the UL grant of the current radio frame, a corresponding PUSCH resource may be located in the following radio frame, and a user device may use the UL grant PUSCH mapping according to the UL and/or DL configuration in the following radio frame (for instance by using a parameter value defined for the UL/DL configuration in the following radio frame). Another option is to use the timing rules defined in A-2 also for PUSCH scheduling.

The embodiment ends in block 406. The embodiment is repeatable in many ways. One example is shown by arrow 408 in FIG. 4.

The steps/points, signaling messages and related functions described above in FIGS. 2 and 4 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

It should be understood that conveying, broadcasting, signalling transmitting and/or receiving may herein mean preparing a data conveyance, broadcast, transmission and/or reception, preparing a message to be conveyed, broadcasted, signalled, transmitted and/or received, or physical transmission and/or reception itself, etc. on a case by case basis. The same principle may be applied to terms transmission and reception as well.

An embodiment provides an apparatus which may be any node, host, server, web stick or any other suitable apparatus capable to carry out processes described above in relation to FIG. 2.

Figure 2:
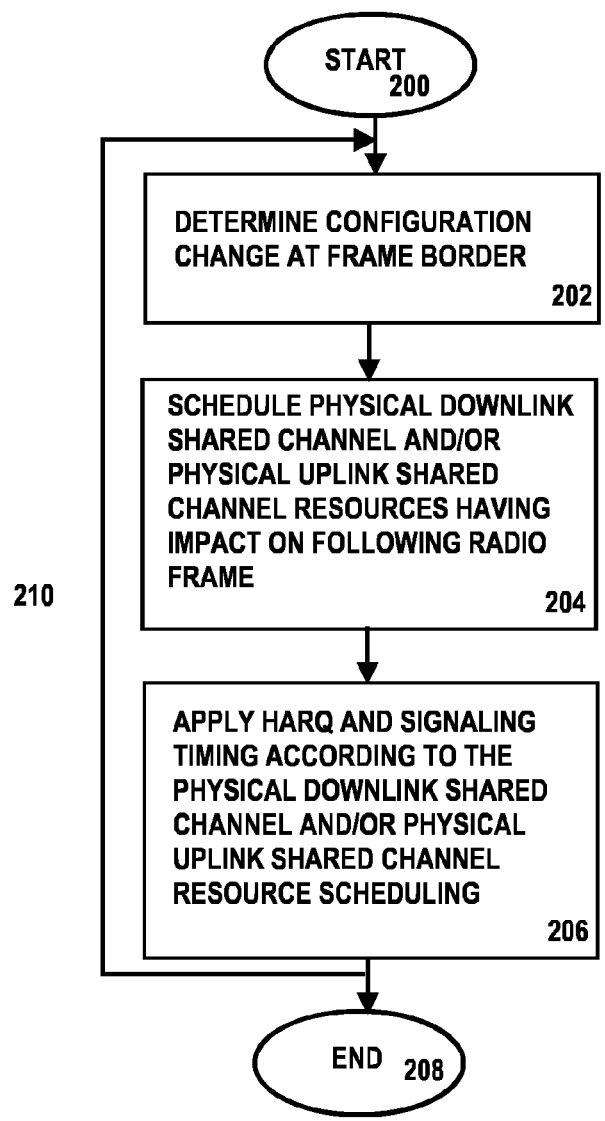
FIG. 2 is a flow chart.

It should be appreciated that an apparatus may include or otherwise be in communication with a control unit, one or more processors or other entities capable of carrying out operations according to the embodiments described by means of FIG. 2. It should be understood that each block of the flowchart of FIG. 2 and any combination thereof may be implemented by various means or their combinations, such as hardware, software, firmware, one or more processors and/or circuitry.

Figure 5:
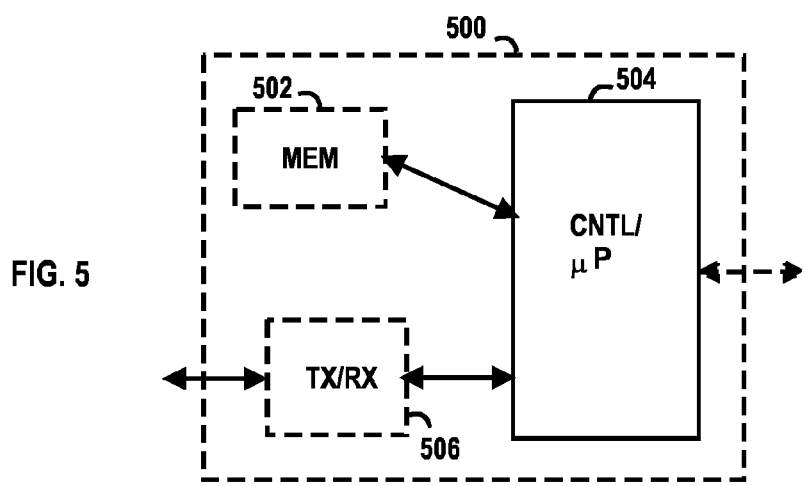
FIG. 5 illustrates examples of apparatuses.

FIG. 5 illustrates a simplified block diagram of an apparatus according to an embodiment.

As an example of an apparatus according to an embodiment, it is shown apparatus 500, such as a node, including facilities in control unit 504 (including one or more processors, for example) to carry out functions of embodiments according to FIG. 2. The facilities may be software, hardware or combinations thereof as described in further detail below.

In FIG. 5, block 506 includes parts/units/modules needed for reception and transmission, usually called a radio front end, RF-parts, radio parts, radio head, etc.

Another example of apparatus 500 may include at least one processor 504 and at least one memory 502 including a computer program code, the at least one memory and the computer program code configured to, with the at least one processor, cause the apparatus at least to: determine a configuration change at a border of a current radio frame and a following radio frame, schedule during the current radio frame physical downlink shared channel and/or physical uplink shared channel resources having an impact on the following radio frame based on the configuration change, and apply hybrid automatic repeat request and signaling timing according to the physical downlink shared channel and/or physical uplink shared channel resource scheduling from a beginning of the following radio frame, wherein a frame carrying the physical downlink shared channel and/or physical uplink shared channel resource scheduling indicates the timing.

Yet another example of an apparatus comprises means 504 for determining a configuration change at a border of a current radio frame and a following radio frame, means 504 for scheduling during the current radio frame physical downlink shared channel and/or physical uplink shared channel resources having an impact on the following radio frame based on the configuration change, and means 504 for applying hybrid automatic repeat request and signalling timing according to the physical downlink shared channel and/or physical uplink shared channel resource scheduling from a beginning of the following radio frame, wherein a frame carrying the physical downlink shared channel and/or physical uplink shared channel resource scheduling indicates the timing.

Yet another example of an apparatus comprises a determiner configured to determine a configuration change at a border of a current radio frame and a following radio frame, a first scheduler configured to schedule during the current radio frame physical downlink shared channel and/or physical uplink shared channel resources having an impact on the following radio frame based on the configuration change, and a second scheduler configured to apply hybrid automatic repeat request and signalling timing according to the physical downlink shared channel and/or physical uplink shared channel resource scheduling from a beginning of the following radio frame, wherein a frame carrying the physical downlink shared channel and/or physical uplink shared channel resource scheduling indicates the timing. It should be appreciated that a first scheduler and a second scheduler may be implemented in many different ways, such as one or more processors It should be understood that the apparatuses may include or be coupled to other units or modules etc., such as radio parts or radio heads, used in or for transmission and/or reception. This is depicted in FIG. 5 as optional block 506.

Although the apparatuses have been depicted as one entity in FIG. 5, different modules and memory may be implemented in one or more physical or logical entities.

An embodiment provides an apparatus which may be any user device or any other suitable apparatus capable to carry out processes described above in relation to FIG. 4. It should be appreciated that the apparatus may be a user device of a commercial network or a public safety network, when configured to operate as a mobile relay (or mobile relay agent) and/or a user device of a public safety network, when configured to operate as a mobile gateway.

Figure 4:
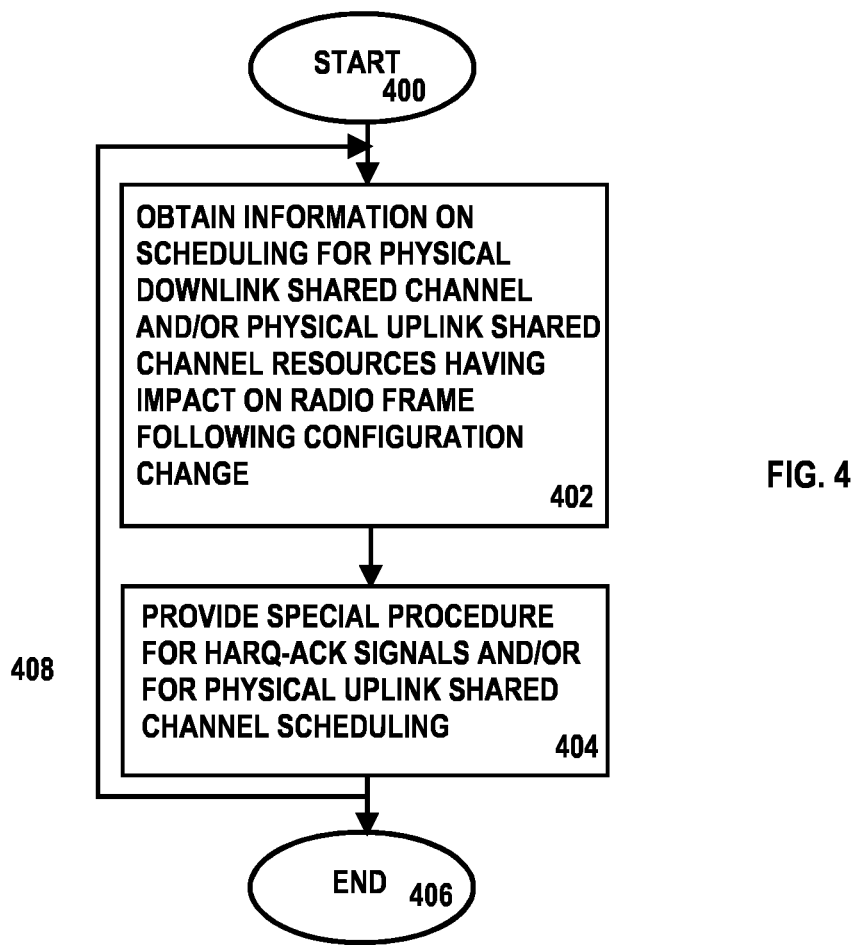
FIG. 4 is another flow chart.

It should be appreciated that an apparatus may include or otherwise be in communication with a control unit, one or more processors or other entities capable of carrying out operations according to the embodiments described by means of FIG. 4. It should be understood that each block of the flowchart of FIG. 4 and any combination thereof may be implemented by various means or their combinations, such as hardware, software, firmware, one or more processors and/or circuitry.

Figure 6:
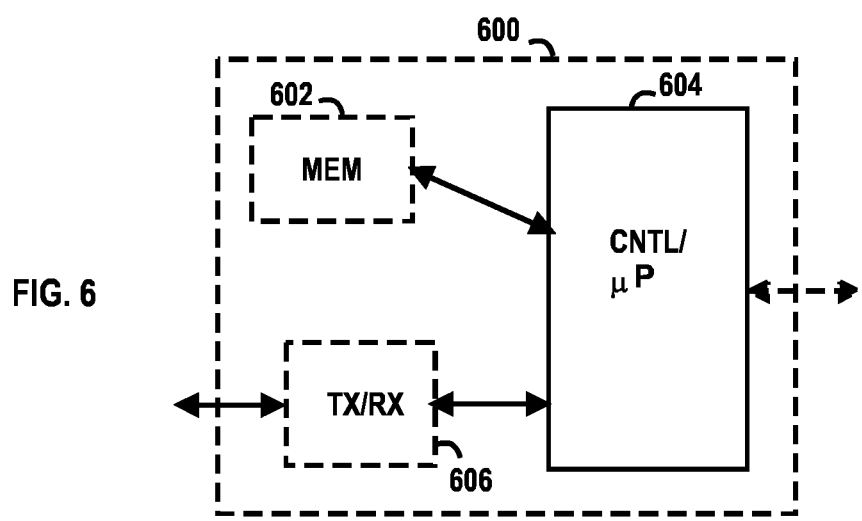
FIG. 6 illustrates other examples of apparatuses.

FIG. 6 illustrates a simplified block diagram of an apparatus according to an embodiment.

As an example of an apparatus according to an embodiment, it is shown apparatus 600, such as a node, including facilities in control unit 604 (including one or more processors, for example) to carry out functions of embodiments according to FIG. 6. The facilities may be software, hardware or combinations thereof as described in further detail below.

In FIG. 6, block 606 includes parts/units/modules needed for reception and transmission, usually called a radio front end, RF-parts, radio parts, radio head, etc.

Another example of apparatus 600 may include at least one processor 604 and at least one memory 602 including a computer program code, the at least one memory and the computer program code configured to, with the at least one processor, cause the apparatus at least to: obtain information on scheduling for physical downlink shared channel and/or physical uplink shared channel resources having an impact on a radio frame following a configuration change, and provide a special procedure for hybrid automatic repeat request acknowledgement signals corresponding to physical downlink shared channel and/or physical uplink shared channel scheduled during a current radio frame, and/or physical uplink shared channel scheduling information obtained during the current radio frame.

Yet another example of an apparatus comprises means 604 (606) for obtaining information on scheduling for physical downlink shared channel and/or physical uplink shared channel resources having an impact on a radio frame following a configuration change, and means 604 for providing a special procedure for hybrid automatic repeat request acknowledgement signals corresponding to physical downlink shared channel and/or physical uplink shared channel scheduled during a current radio frame, and/or physical uplink shared channel scheduling information obtained during the current radio frame.

Yet another example of an apparatus comprises an obtaining unit configured to obtain information on scheduling for physical downlink shared channel and/or physical uplink shared channel resources having an impact on a radio frame following a configuration change, and a providing unit configured to provide a special procedure for hybrid automatic repeat request acknowledgement signals corresponding to physical downlink shared channel and/or physical uplink shared channel scheduled during a current radio frame, and/or physical uplink shared channel scheduling information obtained during the current radio frame.

It should be understood that the apparatuses may include or be coupled to other units or modules etc., such as radio parts or radio heads, used in or for transmission and/or reception. This is depicted in FIG. 6 as optional block 606.

Although the apparatuses have been depicted as one entity in FIG. 6, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
at least one processor and at least one memory including a computer program code, the at least one memory and the computer program code configured to, with the at least one processor, cause the apparatus at least to:
determine a configuration change at a border of a current radio frame and a following radio frame;
schedule during the current radio frame physical downlink shared channel and/or physical uplink shared channel resources having an impact on the following radio frame based on the configuration change, and
apply hybrid automatic repeat request and signaling timing according to the physical downlink shared channel and/or physical uplink shared channel resource scheduling from a beginning of the following radio frame, wherein a frame carrying the physical downlink shared channel and/or physical uplink shared channel resource scheduling indicates the timing.

2. The apparatus of claim 1, further comprising causing the apparatus to:
identify predetermined configuration transitions in relation to absence of hybrid automatic repeat request acknowledgement (HARQ-ACK) channel, absence of an uplink channel and physical uplink shared channel (PDSCH) scheduling.

3. The apparatus of claim 1, further comprising causing the apparatus to:
provide a special procedure for hybrid automatic repeat request acknowledgement (HARQ-ACK) signals corresponding to a physical downlink shared channel (PDSCH) and/or physical uplink shared channel (PUSCH) scheduled during a current radio frame, and/or for physical uplink shared channel (PUSCH) scheduling.

4. The apparatus of claim 3, wherein the special procedure comprises at least one of the following:
changing the hybrid automatic repeat request acknowledgement (HARQ-ACK) and/or physical uplink shared channel (PUSCH) scheduling timing, defining timing for a packet by using a configuration of a radio frame carrying the physical uplink shared channel (PUSCH) and/or physical downlink shared channel (PDSCH) scheduling, and applying for the configuration change a procedure of user device hybrid automatic repeat request acknowledgement (HARQ-ACK) time division duplex when a user device is configured with more than one serving cell and if uplink and/or downlink configurations are different for different cells.

5. The apparatus of claim 3, further comprising causing the apparatus to:
convey a false acknowledgement (ACK) on a physical hybrid automatic repeat request indicator channel (PHICH) to prevent a retransmission by using a configuration employed previous to the configuration change.

6. A method comprising:
determining a configuration change at a border of a current radio frame and a following radio frame;
scheduling during the current radio frame physical downlink shared channel and/or physical uplink shared channel resources having an impact on the following radio frame based on the configuration change, and
applying hybrid automatic repeat request and signaling timing according to the physical downlink shared channel and/or physical uplink shared channel resource scheduling from a beginning of the following radio frame, wherein a frame carrying the physical downlink shared channel and/or physical uplink shared channel resource scheduling indicates the timing.

7. The method of claim 6, further comprising:
identify predetermined configuration transitions in relation to absence of hybrid automatic repeat request acknowledgement (HARQ-ACK) channel, absence of an uplink channel and physical uplink shared channel (PUSCH) scheduling.

8. The method of claim 6, further comprising:
providing a special procedure for hybrid automatic repeat request acknowledgement (HARQ-ACK) signals corresponding to a physical downlink shared channel (PDSCH) and/or physical uplink shared channel (PUSCH) scheduled during a current radio frame, and/or for physical uplink shared channel (PUSCH) scheduling.

9. The method of claim 8, wherein the special procedure comprises at least one of the following:
changing the hybrid automatic repeat request acknowledgement (HARQ-ACK) and/or physical uplink shared channel (PUSCH) scheduling timing, defining timing for a packet by using a configuration of a radio frame carrying the physical uplink shared channel (PUSCH) and/or physical downlink shared channel (PDSCH) scheduling, and applying for the configuration change a procedure of user device hybrid automatic repeat request acknowledgement (HARQ-ACK) time division duplex when a user device is configured with more than one serving cell and if uplink and/or downlink configurations are different for different cells.

10. The method of claim 8, wherein the special procedure comprises at least one of the following:
changing the hybrid automatic repeat request acknowledgement (HARQ-ACK) and/or physical uplink shared channel (PUSCH) scheduling timing, defining timing for a packet by using a configuration of a radio frame carrying the physical uplink shared channel (PDSCH) and/or physical downlink shared channel (PDSCH) scheduling, and applying for the configuration change a procedure of user device hybrid automatic repeat request acknowledgement (HARQ-ACK) time division duplex when a user device is configured with more than one serving cell and if uplink and/or downlink configurations are different for different cells, further comprising:

conveying a false acknowledgement (ACK) on a physical hybrid automatic repeat request indicator channel (PHICH) to prevent a re-transmission by using a configuration employed previous to the configuration change.

11. An apparatus comprising:

at least one processor and at least one memory including a computer program code, the at least one memory and the computer program code configured to, with the at least one processor, cause the apparatus at least to:

determine an uplink/downlink configuration change at a border of a current radio frame and a following radio frame, and determine timing for hybrid automatic repeat request uplink signaling for downlink subframes belonging to the current radio frame but to be transmitted in the following radio frame based on primary cell-secondary cell configuration principles for carrier aggregation with different uplink/downlink configurations for different bands, wherein the primary cell-secondary cell configuration principles for carrier aggregation are applied in such a manner that signals triggered in the current radio frame, the current radio frame having a first uplink/downlink configuration, and to be transmitted in the following radio frame, the following radio frame having a second uplink/downlink configuration, are processed as signals triggered in a secondary cell having the first uplink/downlink configuration, but transmitted on a primary cell having the second uplink/downlink configuration.

12. A method, comprising:

determining an uplink/downlink configuration change at a border of a current radio frame and a following radio frame, and determining timing for hybrid automatic repeat request uplink signaling for downlink subframes belonging to the current radio frame but to be transmitted in the following radio frame based on primary cell-secondary cell configuration principles for carrier aggregation with different uplink/downlink configurations for different bands, wherein the primary cell-secondary cell configuration principles for carrier aggregation are applied in such a manner that signals triggered in the current radio frame, the current radio frame having a first uplink/downlink configuration, and to be transmitted in the following radio frame, the following radio frame a sec uplink/downlink configuration, are processed as signals triggered in a secondary cell having the first uplink/downlink configuration, but transmitted on a primary cell having the second uplink/downlink configuration.

* * * * *

UNITED STATES PATENT AND TRADEMARK OFFICE
CERTIFICATE OF CORRECTION

PATENT NO. : 9,571,252 B2  
APPLICATION NO. : 14/411939  
DATED : February 14, 2017  
INVENTOR(S) : Tiirola et al.

It is certified that error appears in the above-identified patent and that said Letters Patent is hereby corrected as shown below:

In the Claims

Claim 2, Column 15, Line 52 delete "(PDSCH)" and --(PUSCH)-- should be inserted.

Claim 10, Column 16, Line 63 delete "(PDSCH)" and --(PUSCH)-- should be inserted.

Claim 12, Column 18, Line 22 delete "a sec" and --having a second-- should be inserted.

Signed and Sealed this
Twenty-eighth Day of March, 2017

Michelle K. Lee
*Director of the United States Patent and Trademark Office*